United States Patent
Blackburn

(10) Patent No.: US 6,981,718 B2
(45) Date of Patent: Jan. 3, 2006

(54) PROJECTILE FIRING BARREL

(75) Inventor: Jeffery S. Blackburn, Lake Orion, MI (US)

(73) Assignee: Automotive Systems Laboratory, Inc., Farmington Hills, MI (US)

( * ) Notice: Subject to any disclaimer, the term of this patent is extended or adjusted under 35 U.S.C. 154(b) by 0 days.

(21) Appl. No.: 10/716,243

(22) Filed: Nov. 17, 2003

(65) Prior Publication Data

US 2004/0140656 A1    Jul. 22, 2004

Related U.S. Application Data

(60) Provisional application No. 60/426,894, filed on Nov. 15, 2002.

(51) Int. Cl.
*B60R 21/26* (2006.01)
(52) U.S. Cl. .................................................... 280/737
(58) Field of Classification Search ................ 280/737, 280/736, 740, 741
See application file for complete search history.

(56) References Cited

U.S. PATENT DOCUMENTS 6,543,806 B1 * 4/2003 Fink ........................... 280/737

\* cited by examiner

*Primary Examiner*—Faye M. Fleming
(74) *Attorney, Agent, or Firm*—L. C. Begin & Associates, PLLC

(57) ABSTRACT

A gas generator 10 for an inflatable occupant restraint system is provided. The gas generator 10 includes a projectile firing barrel 20 having a touch hole 26 on a side thereof for ignition of a propellant 24 within the barrel 20. Ignition of the propellant 24 drives a projectile 50 through the barrel 20 and into a rupturable seal 36 on a stored gas canister 32. After rupturing the seal 36, the projectile 50 is positively retained between a base end 21 of the barrel 20 and the gas canister 32.

15 Claims, 1 Drawing Sheet

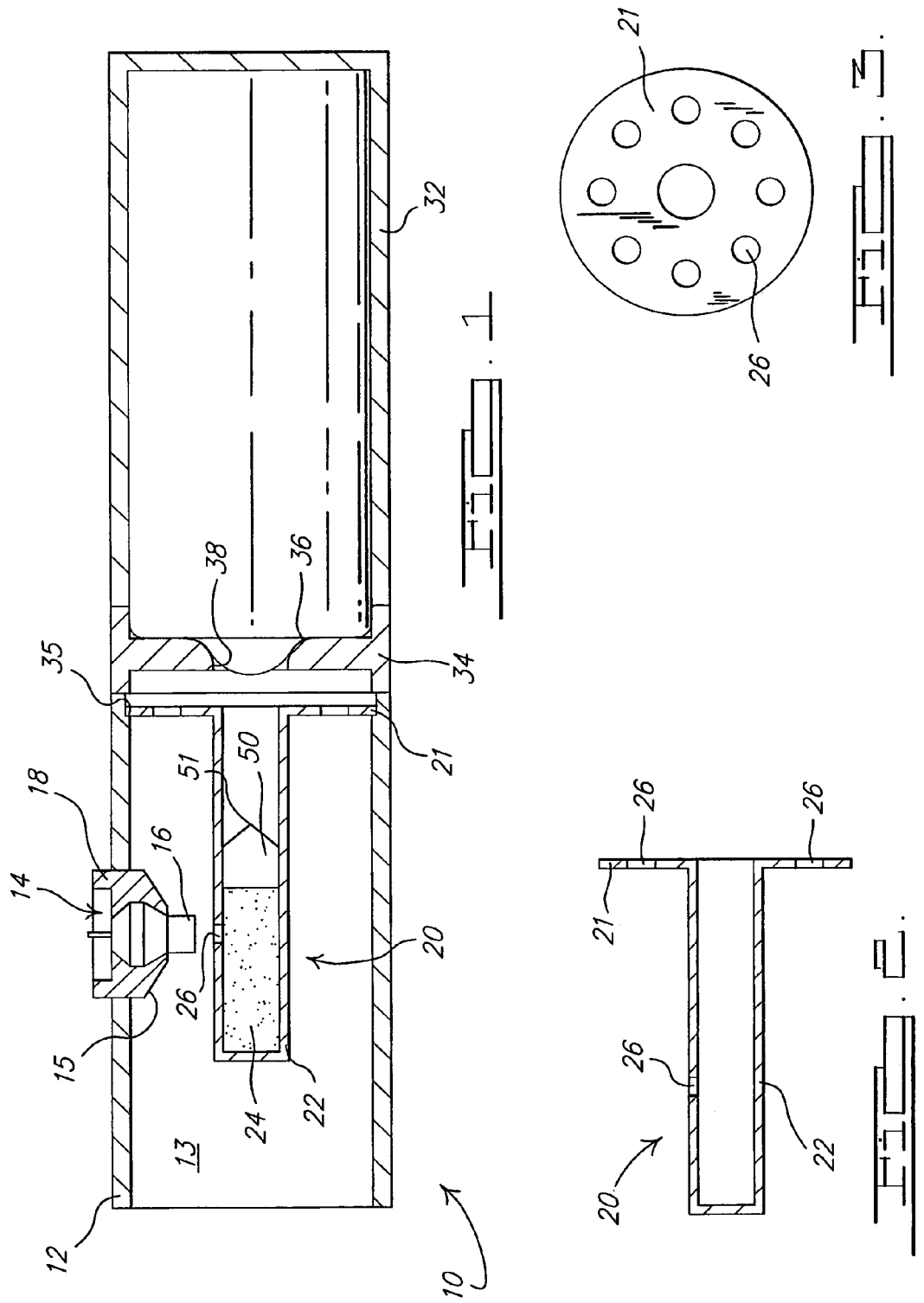

PROJECTILE FIRING BARREL

This Application claims the Benefit of the Filing Date of U.S. Provisional Patent Application Ser. No. 60/426,894 Filed Nov. 15, 2002 and Incorporated By Reference Herein

TECHNICAL FIELD

The present invention relates generally to inflatable occupant restraint systems for use in motor vehicles, and more particularly to a gas generator in such a system utilizing a pyrotechnically driven projectile for releasing inflation gas from a stored gas vessel for inflation of an airbag.

BACKGROUND OF THE INVENTION

Inflatable safety restraint devices have become standard equipment on many new automobiles. Many designs have developed over the years, incorporating a wide variety of components. In a typical design, an inflatable airbag or cushion is mounted in a folded state, and inflated to protect a vehicle occupant in response to an activation signal from an onboard electrical activation system. The gas generator or inflator commonly associated with the system supplies an inflation gas for filling the airbag. The inflator is typically the heaviest and most complex component in such a system. A reduction in weight and manufacturing complexity are often desirable in the automotive industry, and thus it is desirable to reduce the number and complexity of inflator parts.

Various inflator designs and methods have been utilized, for example, many systems employ an ignitable gas generant or pyrotechnic that combusts to rapidly supply inflation gases that are directed into the airbag. Many effective designs are known, however, the inherently hot gases associated with pyrotechnics and particulate material resulting from combustion thereof can present unique concerns. The hot combustion gases must, for example, be cooled to prevent damage to the system materials, particularly the airbag, and also to mitigate potential harm to vehicle occupants. Combustion of the gas generant can create noxious smoke and therefore, the gas generant compositions must be tailored to produce levels in compliance with regulatory and industry standards.

Other systems utilize a stored, pressurized gas in a canister or bottle that is released by rupturing a seal, then directed into the airbag. Advantages of the stored gas systems include lower temperatures of the inflation gases, and the lack of particulates. However, developing a fast-response, reliable system for controllably releasing the pressurized gas has proven difficult. One approach has been to combine a pyrotechnically driven projectile for rupturing the seal on the pressurized gas canister. In such a system, an onboard activation system ignites gas generants to provide an actuation gas for driving the projectile into the subject seal. These systems provide an effective means for quickly and reliably releasing the stored gas, however, relatively high velocities are required of the projectile, and after the projectile has performed its intended function, deflection and bouncing of the projectile in the apparatus may, for example, irreparably damage the associated equipment.

A further challenge to designers relates to igniting the pyrotechnic charge used to drive the projectile. Where the successful deployment of the airbag depends upon accurately and reliably igniting a relatively small pyrotechnic charge to drive a projectile, it is desirable to design a system providing reliable, repeatable performance.

SUMMARY OF THE INVENTION

The present invention provides a gas generator for an inflatable occupant protection system in a motor vehicle. The gas generator preferably includes a gas canister having pressurized gas stored therein and a rupturable seal at an end. An elongate projectile firing barrel having a touch hole, preferably formed in a side thereof, is also provided, and includes a quantity of propellant positioned therein. A projectile is positioned in the barrel and movable therein upon an ignition of the propellant. Ignition of the propellant drives the projectile into the rupturable seal, allowing pressurized gas to exit the canister for inflation of an airbag.

BRIEF DESCRIPTION OF THE DRAWINGS

FIG. 1 is a partially sectioned side view of an inflator according to a preferred embodiment of the present invention;

FIG. 2 is a sectioned side view of a projectile firing barrel according to the present invention;

FIG. 3 is an end view of a projectile firing barrel according to the present invention.

DETAILED DESCRIPTION

Referring to FIG. 1, there is shown an inflator 10 according to a preferred constructed embodiment of the present invention. Inflator 10 is operable to supply gas to rapidly inflate an airbag (not shown) for cushioning a vehicle occupant in the event of a crash or sudden vehicle deceleration, in a manner well known in the art. All the component parts of inflator 10 are either readily commercially available or are formed from known materials and by known processes. Inflator 10 includes a first body portion 12, preferably a substantially cylindrical hollow metallic tube, and a second body portion 32 that comprises a pressurized gas canister or bottle, also preferably substantially cylindrical. Canister 32 can be any of many known pressurized gas canisters, all commercially available. A connector 34, also preferably substantially cylindrical, and having an inwardly extending wall is preferably positioned between body portions 12 and 32, and preferably friction welded to the respective portions, via a process well known in the art. It should be appreciated that embodiments are contemplated wherein first body portion 12 is attached directly to second portion 32, rather than utilizing a connector therebetween. The various components 12, 32, and 34 can be assembled in any order and attached in any fashion, such as any type of weld, threads, press fitting, etc. A partition or nozzle sealing member 36 preferably separates the pressurized interior of canister 32 from an interior 13 of first body portion 12. In a preferred embodiment, partition 36 is laser welded to connector 34, however, it should be appreciated that some other connection means might be employed without departing from the scope of the present invention. Moreover, those skilled in the art will appreciate that because the present invention is applicable to a variety of pressurized gas canisters, the shape of the canister attached to connector 12, and the manner in which it is sealed might vary significantly from the illustrated version in FIG. 2.

A firing barrel 20 is positioned within first body portion 12, and preferably comprises a flange 21 and tube 22. Firing barrel 20 is preferably formed by deep draw stamping, or another suitable known process. Firing barrel 20 is preferably press fit into body portion 12, abutting a ledge 35, although it might be welded thereto or attached by some other means such as by threaded engagement.

Referring now to FIGS. 2 and 3, there are shown side and end views, respectively, of firing barrel 20. Flange 21 preferably includes a plurality of apertures 26, radially arranged around tube 22. In FIG. 1, tube 22 is illustrated as cylindrical in cross-section, however, it should be appreciated that it might be constructed having other shapes without departing from the scope of the present invention. Returning to FIG. 1, a projectile 50 is positioned in tube 22 of firing barrel 20, and is preferably positioned adjacent a pyrotechnic charge 24. Projectile 50 is preferably metallic and includes a pointed or otherwise sharpened end 51, however, different configurations and materials might be utilized without departing from the scope of the present invention. Pyrotechnic charge 24 may be any known gas generator booster propellant, preferably cured in situ. U.S. Publication No. 2002-0079680-A1 incorporated herein by reference describes an exemplary process. Gas generant 24 is positioned within tube 22 and is preferably ignitable via a touch hole 26 that connects an interior of tube 22 with interior space 13 of first body portion 12. Embodiments are contemplated in which the gas generant, preferably in tablet form, is placed within a container or metallic mesh filter in barrel 20.

An initiator assembly 14 is preferably positioned in a body bore 15 in the side of first body portion 12. In a preferred embodiment, initiator assembly 14 comprises an igniter or squib 16, any known suitable igniter, and a retainer 18. Initiator assembly 14 is preferably retained in bore 15 with a weld, for instance a resistance weld, and positioned such that igniter 16 extends into an interior 13 of first body portion 12. It should be appreciated that rather than welding initiator assembly 14 in bore 15, it might be press fit in place or secured by an adhesive or some other means. Igniter 16 is preferably connected to a vehicle electrical activation system in a conventional manner, allowing inflator 10 to be activated in response to a signal from an onboard computer.

In a preferred embodiment, activation of igniter 16 ignites propellant placed in igniter 16 itself or positioned nearby in space 13. Ignition of the propellant creates a flame front that traverses or fluidly communicates with touch hole 26 to ignite the booster propellant 24 in tube 22. Upon activation of gas generant 24, the rapid generation of gas in tube 22 supplies a force that drives projectile 50 through tube 22 toward partition 36. Partition 36 is preferably formed from a relatively thin metallic material capable of being punctured by projectile 50. The pointed end 51 of projectile 50 pierces partition 36, thereby establishing fluid communications between the interior of canister 32 and the interior 13 of body portion 12 via an aperture 38 in connector 34 and the apertures in flange 21. Consequently, pressurized gas for inflation of an associated airbag is supplied from canister 32. In a preferred embodiment, inflation apertures (not shown) in body portion 12 fluidly connect space 13 with an interior of an airbag. Various filters, burst shims, output enhancers, etc., all known in the art may be positioned in the path of the exiting inflation gas as desired. In addition, a wide variety of aperture patterns and means for dispersing the inflation gas might be formed integrally with body portion 12.

The present invention further provides an integral flange trap for capturing the spent projectile 50 after inflator activation. After projectile 50 is driven into and ruptures partition 36, the projectile is preferably positively retained in the space between flange 21 and connector 34.

In one embodiment, flange 21 is keyed relative to body portion 12, allowing insertion therein in a single orientation. In such an embodiment, flange 21 is preferably shaped relative to tube 22 such that upon insertion in body portion 12, touch hole 26 is oriented toward igniter 16. This feature facilitates proper positioning of barrel 20, in turn facilitating ignition of gas generant 24 by positioning touch hole 26 proximate igniter 16, allowing the flame front from activation of igniter 16 to reach gas generant 24 relatively easily. Flange 21 might be formed, for instance, having a non-circular periphery, allowing engagement with body portion 12 in only one, desired orientation. Alternatively, in an embodiment utilizing a threaded engagement between barrel 20 and body portion 12, the components may be threaded such that touch hole 26 is aligned with igniter 16 when barrel 20 is fully screwed into body portion 12.

By positioning initiator assembly 14 in the side of inflator 10 in bore 15, and utilizing a resistance weld, the present invention allows the inflator to be manufactured without a weld joint between the initiator housing and an end of the tube. Moreover, the present invention uses fewer parts than earlier designs, and positively captures the spent projectile. Finally, the design is relatively low cost, simple to assemble, and more reliable in operation than earlier designs.

It should be understood that the present description is for illustrative purposes only, and should not be construed to limit the scope of the present invention in any way. Thus, those skilled in the art will appreciate that various modifications might be made to the presently disclosed embodiments without departing from the scope of the present invention as described above and in the appended claims.

What is claimed is:

1. A gas generator for an inflatable occupant protection system in a motor vehicle comprising:
 a gas canister having a pressurized gas stored therein and a rupturable seal at an end;
 an elongate projectile firing barrel having a touch hole formed in a side thereof;
 a quantity of propellant positioned in said projectile firing barrel and ignitable via a flame front traversing said touch hole; and
 a projectile positioned in said barrel and movable therein upon an ignition of said propellant,
 wherein the ignition of said propellant drives said projectile into said rupturable seal, allowing said pressurized gas to exit said canister for inflation of an airbag.

2. The gas generator of claim 1 further comprising:
 a substantially cylindrical body attached to and surrounding said barrel;
 an initiator assembly positioned in a side surface of said body and substantially aligned with said touch hole, said initiator operable to generate a flame front for ignition of the propellant in said barrel.

3. The gas generator of claim 2 further comprising a quantity of propellant stored in said initiator assembly.

4. The gas generator of claim 2 further comprising a connecting member attached to both of said gas canister and said cylindrical body, said connecting member having a central aperture substantially aligned with said rupturable seal.

5. The gas generator of claim 4 wherein said barrel includes a flange extending outwardly from an end thereof, said flange cooperating with said connecting member to retain said projectile after rupturing said seal.

6. The gas generator of claim 5 wherein said flange is limited in engagement with said body such that said touch hole substantially aligns with the initiator assembly when the barrel is engaged with said body.

7. The gas generator of claim 6 wherein said flange is keyed relative to said body, thereby limiting engagement therewith to a single radial orientation.

8. The gas generator of claim 6 wherein said flange is threadedly received by said body such that a fully threaded engagement therebetween substantially aligns said touch hole with said initiator.

9. A gas generator for an inflatable occupant protection system in a motor vehicle comprising:
  a gas canister having a pressurized gas stored therein and a rupturable seal at a discharge end;
  an elongate projectile firing barrel comprising a base end with an opening oriented toward said rupturable seal;
  a quantity of ignitable propellant positioned in said projectile firing barrel;
  a projectile positioned in said barrel and movable therein upon ignition of said propellant; and
  a body member positioned about said projectile firing barrel, and a connecting member connecting said gas canister and said body member, said connecting member having an inwardly extending wall with a central aperture substantially aligned with said rupturable seal,
  wherein upon ignition of said propellant, said projectile is driven into and ruptures said rupturable seal, thereby releasing the pressurized gas for inflation of an airbag, said projectile being retained thereafter between said base end and said discharge end.

10. The gas generator of claim 9 wherein:
  said barrel is substantially cylindrical; and
  said base end includes a substantially planar flange positioned opposite said inwardly extending wall, said projectile retained between said wall and said flange after rupturing said seal.

11. An occupant protection system for a motor vehicle comprising:
  an inflatable restraint cushion;
  a gas generator operable to supply inflation gas to said cushion, wherein said gas generator comprises:
    a first substantially cylindrical body having a pressurized gas stored therein and a rupturable seal;
    a connecting member attached to the first body and having a central aperture substantially aligned with said rupturable seal;
    a second substantially cylindrical body attached to said connecting member;
    a projectile firing barrel positioned in an interior of said second body, said barrel including a flange extending from a base end, and an opening oriented toward said rupturable seal;
    a projectile movable in an interior of said barrel;
    a propellant composition located in said barrel and ignitable to drive said projectile;
    wherein upon propellant activation said projectile is driven through said barrel and into said rupturable seal, thereby liberating the contents of said first body, said projectile being retained thereafter between said flange and said connecting member.

12. The system of claim 11 wherein said second body includes an initiator assembly attached along a lateral side.

13. The system of claim 12 wherein said projectile firing barrel is substantially cylindrical and includes a touch hole along a lateral side and substantially aligned with said initiator assembly.

14. The system of claim 11 wherein said flange comprises a plurality of radial apertures for fluidly connecting an interior of said first body with an interior of said second body upon rupturing of said rupturable seal.

15. The system of claim 11 wherein said first body includes a plurality of apertures for providing fluid communications between an interior of said first body and said inflatable restraint cushion.

* * * * *